United States Patent [19]

Sorensen

[11] 4,234,201
[45] Nov. 18, 1980

[54] CHUCK FOR MINIATURE ROTARY TOOL

[76] Inventor: Irvin Sorensen, 1015 Manchester St., Arlington, Va. 22205

[21] Appl. No.: 7,198

[22] Filed: Jan. 29, 1979

[51] Int. Cl.³ .............................................. B23B 31/08
[52] U.S. Cl. .................................... 279/77; 279/1 B; 279/1 C; 279/79
[58] Field of Search .................. 279/77, 79, 1 C, 1 B, 279/1 ME, 76, 1 SG; 409/231; 403/327, 329, 330; 64/4, 15 R, 15 B

[56] References Cited

U.S. PATENT DOCUMENTS

| 799,787 | 9/1905 | Gessert | 279/77 |
|---|---|---|---|
| 1,071,433 | 8/1913 | Kenerson | 279/77 X |
| 1,753,441 | 3/1930 | Morehouse | 279/77 X |
| 2,259,797 | 10/1941 | Cohen | 279/79 X |
| 2,356,245 | 8/1944 | Johnston | 279/1 C |
| 3,132,426 | 5/1964 | White | 279/1 C |
| 3,495,844 | 2/1970 | Dee | 279/1 C |
| 3,709,508 | 1/1973 | Dudley | 279/1 C |
| 3,795,455 | 3/1974 | Kosmowski | 279/1 C X |

FOREIGN PATENT DOCUMENTS

| 48895 | 8/1919 | Sweden | 279/79 |
|---|---|---|---|
| 240448 | 3/1969 | U.S.S.R. | 279/1 C |

*Primary Examiner*—William R. Briggs
*Attorney, Agent, or Firm*—Birch, Stewart, Kolasch & Birch

[57] ABSTRACT

The present invention is directed to a chuck for use in a motor driven tool. The chuck is internally mounted within a transverse opening which intersects a longitudinal opening in the output shaft of the motor driven tool and includes an internal, transversely mounted hardened roller which locks a tool bit in the motor output shaft only when a torque or resistance is applied to the tool bit. The torque or resistance creates a twisting moment applied about the axis of the tool bit to lift the roller into engagement with an interior portion of the transverse opening to thereby lock the bit relative to the motor driven tool. In the quiescent state the tool bit is unlocked and may be readily removed from the motor driven tool or inserted at almost any given angle. The motor output shaft and associated bearings provide essentially the entire structural support for the tool housing. One of these bearings is disposed on the opposite side of the chuck from the motor thus providing balanced support for the long motor output shaft, which precludes wobble and malalignment of the chuck.

5 Claims, 9 Drawing Figures

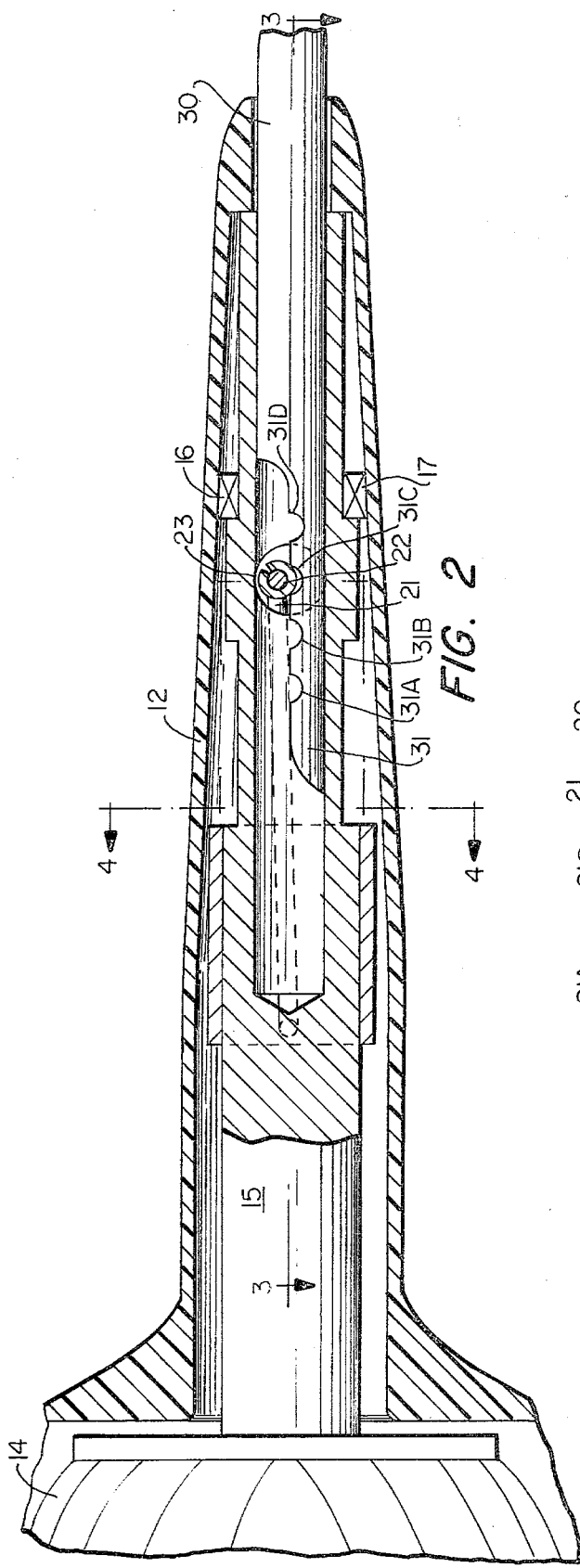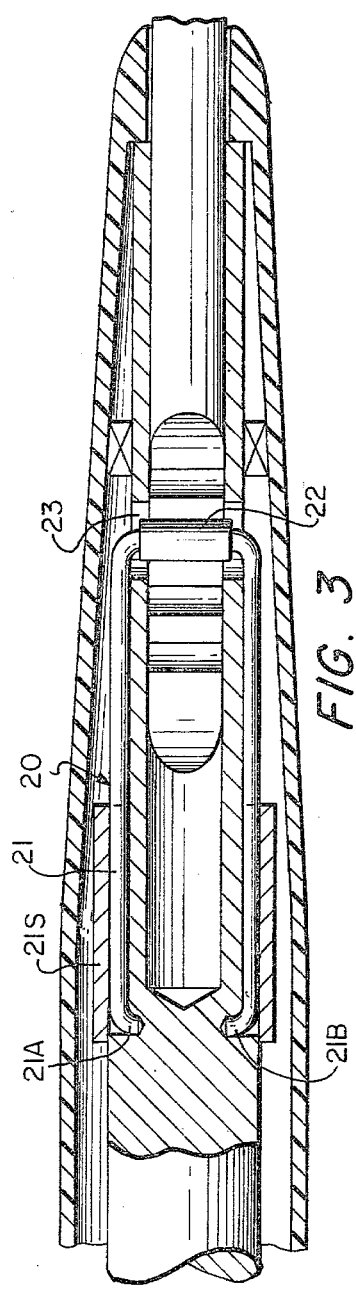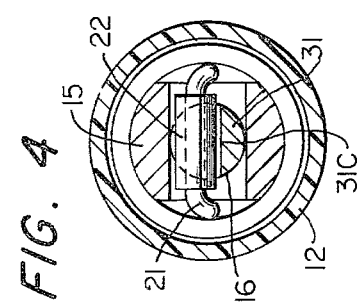

CHUCK FOR MINIATURE ROTARY TOOL

BACKGROUND OF THE INVENTION

1. Field of the Invention

The present invention relates to a chuck assembly for use with a motor driven tool.

2. Description of the Prior Art

Many exemplary chuck assemblies are available in the prior art for operatively connecting a tool bit to a motor driven tool. For example, U.S. Pat. No. 2,259,797, to Cohen discloses a manicuring tool holder wherein a clutch spring 29 operatively positions the tool shank 37 relative to the hand piece 19. The clutch spring 29 includes an arched portion 32 which mates with the concave circular portion 39 to lock the tool shank 37 in position.

U.S. Pat. No. 2,405,961, to Lapointe discloses a pull head for a broaching machine wherein the shank of the broach is removably secured. The body portion 1 includes an opening into which a plunger 14 and a locking member 10 are received for longitudinal motion. In addition, a bore 6 is provided to receive a shank 7. The shank 7 includes an arcuate notch or groove 9 which is adapted to receive the locking member 10 when the shank 7 is inserted into the bore 6.

U.S. Pat. No. 1,071,433 to Kenerson discloses a detachable tool holder which frictionally holds a tool shank relative to a handle member. A U-shaped spring wire d is connected to a handle a. The U-shaped wire includes a roller e which is designed to engage a groove or recess c' on the shank portion of the tool c.

U.S. Pat. No. 776,204 to Sargent generally discloses a motor operatively connected to a tool bit. However, the Sargent patent does not disclose a chuck assembly as set forth in the present invention.

Other prior art devices are known which include cable-driven complicated and bulky collet chucking devices.

The chuck assembly in each of the above-described prior art systems are too complex and bulky to facilitate the construction of a small motor-driven, hand-held drill or grinder that really fits the human hand and fingers. There is a need in the art for a pencil-like structure for drilling and grinding operations, which is a pleasure for artists and craftsmen to use for a wide variety of crafts. The chuck assembly of the present invention makes it possible to achieve such a structure for reasons to become fully apparent hereinafter.

SUMMARY OF THE INVENTION

Accordingly, it is a primary object of the present invention to provide a compact and efficient chucking system, which facilitates the fabrication of a pencil-like structure for drilling and grinding operations, which comfortably fits the hands and fingers of a craftsman.

It is another object of the present invention to provide a chuck assembly which will quickly and efficiently operatively position a tool bit relative to the output shaft of a motor driven tool.

A further object of the present invention is to provide a chuck assembly which includes an internal, transversely mounted hardened roller which firmly locks a tool bit relative to a motor driven shaft when a twisting moment is applied to the tool bit.

Another object of the present invention is to provide a chuck assembly which can be constructed within an elongated shaft extending from a motor adapted to drive the tool bit.

A still further object of the present invention is to provide a chuck assembly which permits a tool bit to be inserted and locked within the tool housing in a plurality of various depths.

A still further object of the present invention is to provide a chuck assembly which locks a tool bit relative to the tool housing when a torque or resistance is applied to the tool bit and unlocks the tool bit when the motor driven tool is in the quiescent state.

Yet another object of the present invention is to provide essentially the full support for the motor driven tool housing on bearings on the motor output shaft permitting the fabrication of the tool housing from lightweight materials such as plastic.

Still another object of the present invention is to provide a chuck assembly which permits insertion of the tool bit at almost any desired angle.

It is still a further object of the present invention to provide a bearing structure for an elongated motor shaft which precludes wobble and misalignment of the associated chuck assembly.

The objects of the present invention are fulfilled by providing a novel chuck assembly including an internal, transversely mounted hardened roller which locks a tool bit with with respect to the motor output shaft when a twisting moment is applied to the tool bit. Applying torque or resistance to the tool bit lifts the roller into engagement with an interior wall of a chuck housing in the shaft, thereby locking the bit relative to the shaft of the motor driven tool. In the quiescent state the tool bit is unlocked and may be readily removed from the motor driven tool. The motor output shaft and associated bearings provide essentially the entire structural support for the tool housing. One of these bearings is disposed on the opposite side of the chuck from the motor thus providing balanced support for the long motor output shaft, which precludes wobble and malalignment of the chuck.

Further scope of applicability of the present invention will become apparent from the detailed description given hereinafter. However, it should be understood, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a partial cross-sectional view of the tool of FIG. 1 showing the details of the chuck assembly positioned within the tool housing;

FIG. 3 is a partial cross-sectional plan view of the chuck assembly taken along line 3—3 of FIG. 2 according to the present invention;

FIG. 4 is a cross-sectional view taken along line 4—4 of FIG. 2;

DETAILED DESCRIPTION OF THE INVENTION

Figure 1:
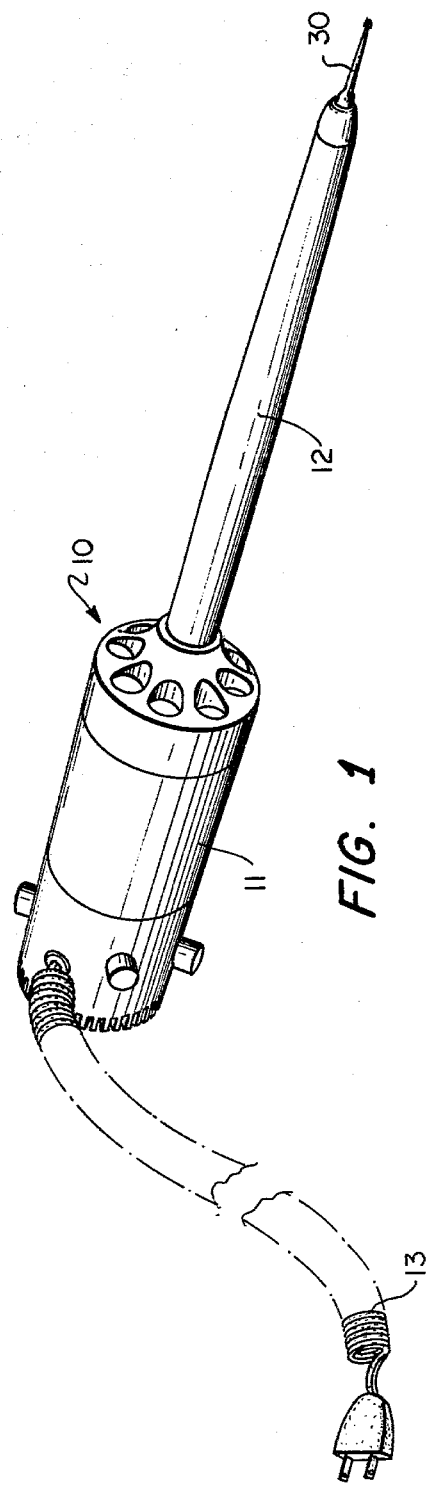
FIG. 1 is a perspective view illustrating the motor driven tool of the present invention with a tool bit operatively positioned therein.
Figure 5:
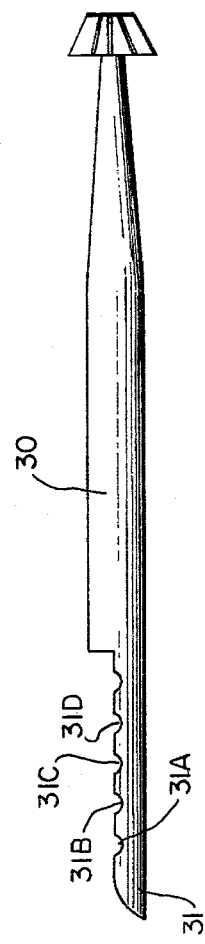
FIG. 5 is a side elevational view of a preferred embodiment of a tool bit and shank portion adapted for use in combination with the chuck assembly of the present invention.

The present invention is directed to a chuck assembly for a motor driven tool. The motor driven tool, generally indicated by character 10, includes a motor housing 11 and a shaft housing 12. FIG. 1 schematically illustrates the positioning of a tool bit 30 relative to the shaft housing 12. Positioned within the motor housing 11 is a motor which may be driven by alternating current through the cord 13 or may be battery operated.

FIGS. 2, 3 and 4 illustrate a preferred embodiment of the chuck assembly according to the present invention. Referring to FIG. 2, a motor 14 includes an elongated output shaft 15 with a longitudinal bore 16 extending inwardly from an outermost end thereof. A shaft housing 12 of metal or plastic surrounds the elongated output shaft 15 and supports an outer end of the shaft by means of a bearing 17. Although not illustrated in the drawings, the shaft 15 which projects through the motor 14 is supported at the opposite end of the main housing 11 by means of a similar bearing. By providing a bearing support on each end of the output shaft wobble and misalignment of the shaft is eliminated.

The chuck assembly according to the present invention is generally indicated by character 20. The chuck assembly includes a substantially U-shaped spring member 21 with inwardly projecting ears 21A, 21B which are secured within openings in the motor output shaft 15. To secure the longitudinal position of the spring member 21 relative to the output shaft 15, a sleeve 21S surrounds the end portion of the U-shaped spring member adjacent to the position where the ears 21A, 21B are secured to the output shaft 15. The sleeve 21S may be welded or similarly secured to the output shaft 15.

A roller 22 is positioned on the U-shaped spring member 21 and is adapted to engage a shank portion 31 of the tool bit 30. The shank portion 31 is semicircular in cross-section as illustrated in FIG. 4. The top surface of shank portion 31 is substantially flat and acts as a cam surface in a manner to be described more fully hereinafter. The roller 22 may be constructed of case hardened steel and is designed to prolong the life of the chuck assembly. However, the U-shaped spring member 21 may be employed without the roller 22 and will function, although not as well, in a similar manner to the preferred embodiment illustrated in the drawings.

Figure 6A:
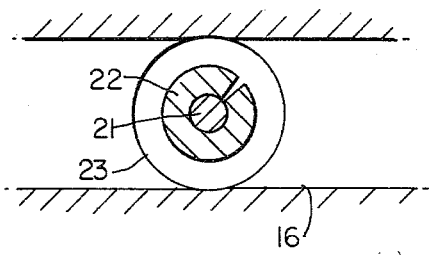
FIG. 6A schematically illustrates the positioning of the wire and roller of the chuck assembly within the chuck aperture in the normal position without a tool inserted.

The middle portion of U-shaped spring member 21 and the roller 22 are positioned within a chuck aperture 23. The chuck aperture 23 is approximately of the same diameter as the longitudinal bore 16, and extends transversely therethrough. In the normal position, as illustrated in FIG. 6A, the U-shaped spring wire 21 and the roller 22 are centrally disposed within the chuck aperture 23. Centrally positioning the elements in this manner permits the insertion of the shank portion of a tool bit in almost any orientation, except orthogonally with respect to roller 22. As previously mentioned, the roller 22 rotates about the U-shaped spring member 21 and reduces wear caused by frictional engagement of the shank portion 31 when inserting or removing the tool bit. Reducing wear between the elements prolongs the life of the chuck assembly. However, the chuck assembly may be constructed without the roller 22 and will operate in a similar manner as to the preferred embodiment of the present invention.

Figure 6B:
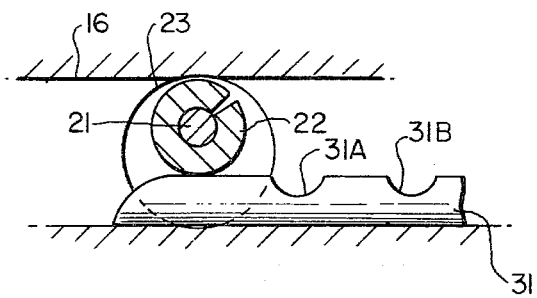
FIG. 6B schematically illustrates the position of the wire and roller of the chuck assembly within the chuck aperture when the shank portion of a tool bit is initially inserted.
Figure 6C:
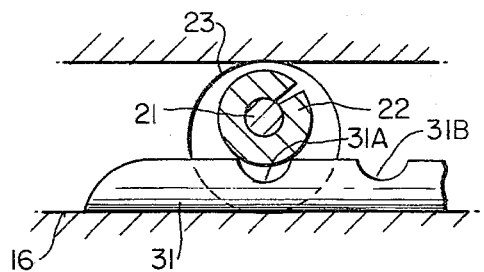
FIG. 6C is schematically illustrating a detented position of the wire and roller of the chuck assembly relative to a shank portion of a tool bit.

FIGS. 6B and 6C illustrate various positions of the U-shaped spring member and the roller as the shank portion of a tool bit is inserted in the longitudinal bore 16. As insertion of the bit begins, as illustrated in FIG. 6B, the U-shaped spring member 21 and the roller 22 are biased upwardly from the normal centrally disposed position of FIG. 6A to a position where the upper portion of the roller 22 is almost in contact with the walls of chuck aperture 23. The lower portion of the roller 22 is positioned on the shank portion 31 of the tool bit 30 but is not yet detented.

FIG. 6C illustrates a detented position of the U-shaped spring member 21 and the roller 22. The lowermost portion of the roller 22 is partially positioned within a semi-circular slot 31A to frictionally secure the shank portion 31 of the tool bit 30 longitudinally of bore 16. The uppermost portion of the roller 22 is disposed a short distance from the chuck aperture 23. By arranging the elements in this manner and providing a plurality of semi-circular slots 31A, 31B, 31C and 31D, the tool bit 30 may be positioned in a variety of various depths within the longitudinal bore 16. In addition, since the roller 22 only partially projects into one of the semi-circular slots 31A-31D, the shank portion 31 of the tool bit 30 is readily released from engagement with the chuck assembly 20 when the apparatus is in the quiescent state by merely exerting a longitudinal force on the tool bit 30.

FIG. 4 illustrates a cross-sectional view taken along line 4—4 of FIG. 2. This cross-sectional view shows the relative positioning of the chuck assembly 20 in a similar manner as illustrated in FIG. 6C. Again, the roller 22 partially projects into the semi-circular slot 31C to readily permit the removal of the semicircular shank portion 31 of the tool bit 30 from the longitudinal bore 16.

Figure 6D:
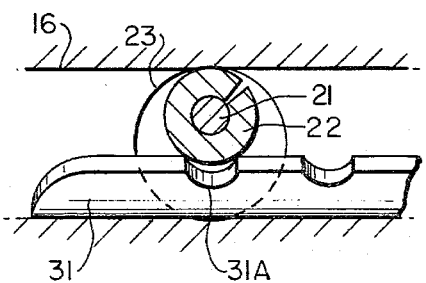
FIG. 6D schematically illustrates the detented position of the wire and roller of the chuck assembly within the chuck aperture after a torque or resistance is applied to the tool bit.

FIG. 6D illustrates the relative positioning of the elements when torque or resistance is applied to the tool bit 30 and transmitted to the shank portion 31. As torque is applied to the tool bit 30 it tends to twist the shank portion 31 within the longitudinal bore 16. The rotation of the flat top surface of the shank portion 31 cams the roller 32 into contact with the upper surface wall of the chuck aperture 23. In this position the shank portion 31 and the tool bit 30 are locked within the longitudinal bore 16 and therefore rotate together with the output shaft 15. As the torque or resistance applied to the tool bit 30 and therefore the shank portion 31 increases, there is a corresponding proportional increase in the locking force of the roller 22 against the wall of the chuck aperture 23. As illustrated in FIG. 6D, the shank portion 31 tends to twist as a torque or resistance is applied to the tool bit 30. This twisting action raises one edge of the top flat surface of the shank portion 31 downwardly out of engagement with the roller 22. However, the opposite edge of the top flat surface of the shank portion 31 is moved tightly against roller 22. This twisting motion of the shank portion 31 correspondingly imparts the motion to the roller 22 to cause engagement with the interior wall of the chuck aperture 23.

After the desired machining is performed and the torque is removed from the tool bit 30, the U-shaped spring 21 and the roller 22 tend to bias downwardly the twisted shank portion 31. Therefore, the relative positioning of the elements after the torque is removed from the tool bit 30 will be similar to the arrangement of elements as illustrated in FIG. 6C. In this position with no rotary force applied to the output shaft 15, the tool bit 30 may be readily removed from the chuck assembly 20.

Although the relative size of all the elements described above may be varied to adapt the chuck assembly to any desired use, it has been found desirable in a small motor driven, hand held tool to use the following dimensions. A desirable output shaft would have a diameter of approximately 0.702 inches. This diameter of the output shaft would be reduced 30% to a diameter of 0.540 inches and extends along the output shaft 15. Thereafter, for a distance of approximately 0.700 inches the output shaft is enlarged to a diameter of approximately 0.702 inches and positions therein the chuck aperture 23. The diameter of the chuck aperture 23 and the longitudinal bore 16 are approximately 0.375 inches. The output shaft is again reduced in diameter to approximately 0.555 inches for a distance of 1.665 inches. The preferred dimensions of a tool bit and shank portion which would operatively mate with the preferred dimensions of the chuck assembly, listed above, would require the shank to be approximately 0.210 inches in thickness. The semi-circular slots provided on the flat surface of the shank portion would be approximately 0.020 inches in radius. In addition, the diameter of the roller 22 which would be positioned within the semi-circular slots would be approximately 0.200.

The chuck assembly according to the present invention makes it possible to construct a motor driven, hand held tool which is pencil-like in appearance. This improved tool may be used by a variety of different professionals, for example, dentists, artists, and craftsmen. The novel chucking assembly can be constructed on a common shaft with the motor. Therefore, the bearing that is used for the motor can support one end of the common shaft and a second bearing may be conveniently positioned adjacent to the outermost end of the shaft in close proximity to the positioning of the chuck assembly. This arrangement permits the construction of the small hand-held motor driven tools from plastic since the support for the chuck will be directly connected to the output shaft of the motor. This is an important factor since it will reduce the cost of manufacturing or mass producing the tool.

The torque applied to the tool bit tightens the shank portion and the roller against the chuck aperture. This holding or tightening action is true in both a clockwise and counterclockwise rotation. The chuck assembly according to the present invention may be used for quick set line shafting as well as multiple drill heads and gang drills. For line shafting the detents 31A-31D may be formed deeper in the shank portion 31 to produce a semi-permanent lock coupling.

It should be noted that the shank of the tool bit 30 in the detent region 31 has a portion of the cylindrical shank removed which would normally tend to unbalance the bit. However, the novel structure of the present invention, namely, the central portion of the U-shaped spring 21 and the roller 22 therein fill the space left by the removed portion and thus balance the tool bit in the chuck.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A motor driven rotary tool comprising;
a rotatable drive shaft having a longitudinal axis;
a chuck assembly rotatable with said drive shaft and having a longitudinal bore therein extending along the same direction as the longitudinal axis of said drive shaft, said longitudinal bore having diametrically opposed sidewall portions;
a tool bit having a shank portion with a semi-circular cross-section transversely of the longitudinal axis thereof in the provision of a flat surface on said shank portion; and
a U-shaped wire spring having a pair of legs and a central portion, said legs being secured to the external surface of said drive shaft and extending therealong, parallel to said longitudinal axis, said central portion passing transversely through said longitudinal bore and being normally centered in said bore, the cumulative cross-sectional dimension of said shank portion and said central portion of said wire spring being less than the diameter of said longitudinal bore when said flat surface is substantially parallel to said central portion, said cumulative cross-sectional dimension equalling and teding to exceed said diameter of said bore when said flat surface is disposed at a predetermined angle with respect to said central portion;
whereby said tool bit is secured within said bore when said flat surface is twisted to said predetermined angle with respect to said central portion.
2. A motor driven rotary tool comprising:
a rotatable drive shaft having a longitudinal axis;
a chuck assembly rotatable with said drive shaft and having a longitudinal bore therein extending along the same direction as the longitudinal axis of said drive shaft, said longitudinal bore having diametrically opposed sidewall portions;
a tool bit having a shank with a cam surface thereon removably positioned in said longitudinal bore; and
rod means positioned in said longitudinal bore for releasably engaging said cam surface on said tool bit, said rod means being normally disposed in a first position substantially centered between said diametrically opposed sidewall portions of said longitudinal bore and spaced therefrom to permit said tool bit shank to be positioned on either side thereof, said rod means being engageable by said cam surface as said tool bit is inserted into said longitudinal bore to displace said rod means from said first position to a second position wherein said rod means releasably indexes said tool bit in said longitudinal bore, said rod means being further movable by said cam surface against one of said diametrically opposed sidewall portions in response to rotation of said tool bit shank with respect to said chuck assembly to secure said tool bit shank between said rod means and the other one of said diametrically disposed sidewall portions the cumulative cross-sectional dimension of said tool bit shank and said rod means being less than the diameter of said longitudinal bore when said rod means releasably indexes said tool bit and said cumulative cross-sectional dimension equalling and tending to exceed said diameter of said longitudinal bore when said tool bit shank is secured between said rod means and said other one of said diametrically disposed side wall portions.

3. A motor driven rotary tool comprising:

a rotatable drive shaft having a longitudinal axis;

a chuck assembly rotatable with said drive shaft and having a longitudinal bore therein extending along the same direction as the longitudinal axis of said drive shaft, said longitudinal bore having diametrically opposed sidewall portions;

a tool bit having a shank portion with a flat surface thereon; and rod means passing transversely through said longitudinal bore and being normally centered in said bore, the cumulative cross-sectional dimension of said shank portion and said rod means being less than the diameter of said longitudinal bore when said flat surface is substantially parallel to said rod means, and said cumulative cross-sectional dimension equalling and tending to exceed said diameter of said bore when said flat surface is disposed at a predetermined angle with respect to said rod means;

whereby said tool bit is secured within said bore when said flat surface is twisted to said predetermined angle with respect to said rod means.

4. The rotary tool of claims 2 or 3, wherein said rod means is fabricated from spring steel and is substantially U-shaped, having a pair of leg portions and a central portion, said leg portions being attached to the outer surface of said drive shaft and extending therealong, said central portion extending transversely through said longitudinal bore for operative engagement with said tool bit shank.

5. The rotary tool of claim 4, wherein said rod means includes a roller mounted on said central portion for engaging said tool bit shank.

* * * * *